US008467655B2

(12) United States Patent
German et al.

(10) Patent No.: US 8,467,655 B2
(45) Date of Patent: Jun. 18, 2013

(54) PATCH PANEL CABLE INFORMATION DETECTION SYSTEMS AND METHODS

(75) Inventors: Michael German, Secaucus, NJ (US); Daniel W. Macauley, Fishers, IN (US); G. Mabud Choudhury, Warren, NJ (US)

(73) Assignee: CommScope Inc. of North Carolina, Hickory, NC (US)

( * ) Notice: Subject to any disclaimer, the term of this patent is extended or adjusted under 35 U.S.C. 154(b) by 208 days.

(21) Appl. No.: 13/228,122

(22) Filed: Sep. 8, 2011

(65) Prior Publication Data

US 2012/0000977 A1    Jan. 5, 2012

Related U.S. Application Data

(63) Continuation of application No. 12/708,173, filed on Feb. 18, 2010, now Pat. No. 8,092,249.

(60) Provisional application No. 61/153,836, filed on Feb. 19, 2009.

(51) Int. Cl.
*G02B 6/00* (2006.01)
(52) U.S. Cl.
USPC .......................................................... 385/147
(58) Field of Classification Search
USPC .. 439/49, 541.1, 489; 235/375, 492; 702/127; 385/133–135; 713/300, 340
See application file for complete search history.

(56) References Cited

U.S. PATENT DOCUMENTS

| | | | |
|---|---|---|---|
| 5,737,475 A * | 4/1998 | Regester | 385/134 |
| 6,350,148 B1 | 2/2002 | Bartolutti et al. | |
| 6,784,802 B1 | 8/2004 | Stanescu | |
| 6,871,156 B2 * | 3/2005 | Wallace et al. | 702/127 |
| 7,297,018 B2 * | 11/2007 | Caveney et al. | 439/488 |
| 7,374,101 B2 * | 5/2008 | Kaneko | 235/492 |
| 7,455,527 B2 * | 11/2008 | Nordin et al. | 439/49 |
| 7,677,896 B1 * | 3/2010 | Sonwalkar | 434/236 |

(Continued)

FOREIGN PATENT DOCUMENTS

| JP | 07094242 | 4/1995 |
|---|---|---|
| WO | WO 2006/063023 A1 | 6/2006 |

OTHER PUBLICATIONS

Notification of Transmittal of the International Search Report and Written Opinion of the International Searching Authority issued Jul. 1, 2010 by the European Patent Office for corresponding PCT application No. PCT/US2010/024567.

*Primary Examiner* — Phuong Dinh
(74) *Attorney, Agent, or Firm* — Myers Bigel Sibley & Sajovec, P.A.

(57) ABSTRACT

A communications system includes a plurality of patch panels, wherein each patch panel has a plurality of connector ports on a front surface thereof that are each connected to a respective communication line, and one or more optical couplers/connector ports on a rear surface thereof for linking two or more patch panels together. A cable for linking patch panels includes opposite ends and a respective connector at each end that is configured to be removably secured within a respective coupler/connector port on the rear surface. Each connector has an RFID tag attached thereto. An RF antenna is secured to each patch panel adjacent each respective coupler, and each antenna is configured to activate and read information from a cable RFID tag when a cable connector is secured within a coupler adjacent thereto.

9 Claims, 4 Drawing Sheets

U.S. PATENT DOCUMENTS

2007/0247284 A1* 10/2007 Martin et al. ................ 340/10.1
2010/0142544 A1* 6/2010 Chapel et al. ................ 370/401
2011/0049232 A1* 3/2011 Khozyainov .................. 235/375
2012/0198246 A1* 8/2012 German et al. ............... 713/300

* cited by examiner

PATCH PANEL CABLE INFORMATION DETECTION SYSTEMS AND METHODS

RELATED APPLICATION

This application is a continuation application of U.S. patent application Ser. No. 12/708,173, filed Feb. 18, 2010 now U.S. Pat. No. 8,092,249, which claims the benefit of and priority to U.S. Provisional Patent Application No. 61/153,836, filed Feb. 19, 2009, the disclosures of which are incorporated herein by reference as if set forth in their entireties.

FIELD OF THE INVENTION

The present invention relates generally to communications systems and, more particularly, to communications patching systems.

BACKGROUND

Many businesses have dedicated communication systems that enable computers, telephones, facsimile machines and the like to communicate with each other through a private network, and with remote locations via a communications service provider. In most buildings, the dedicated communications system is hard wired using communication cables that contain conductive wire. In such hard wired systems, dedicated wires are coupled to individual service ports throughout the building. The wires from the dedicated service ports extend through the walls of the building to a communications closet or closets. The communications lines from the interface hub of a main frame computer and the communication lines from external communication service providers may also terminate within a communications closet.

A patching system is typically used to interconnect the various communication lines within a communications closet. In a communications patching system, all of the communication lines are terminated within a communications closet in an organized manner. The organized terminations of the various lines are provided via the structure of the communications closet. A mounting frame having one or more racks is typically located in a communications closet. The communications lines terminate on the racks, as is explained below.

Figure 1:
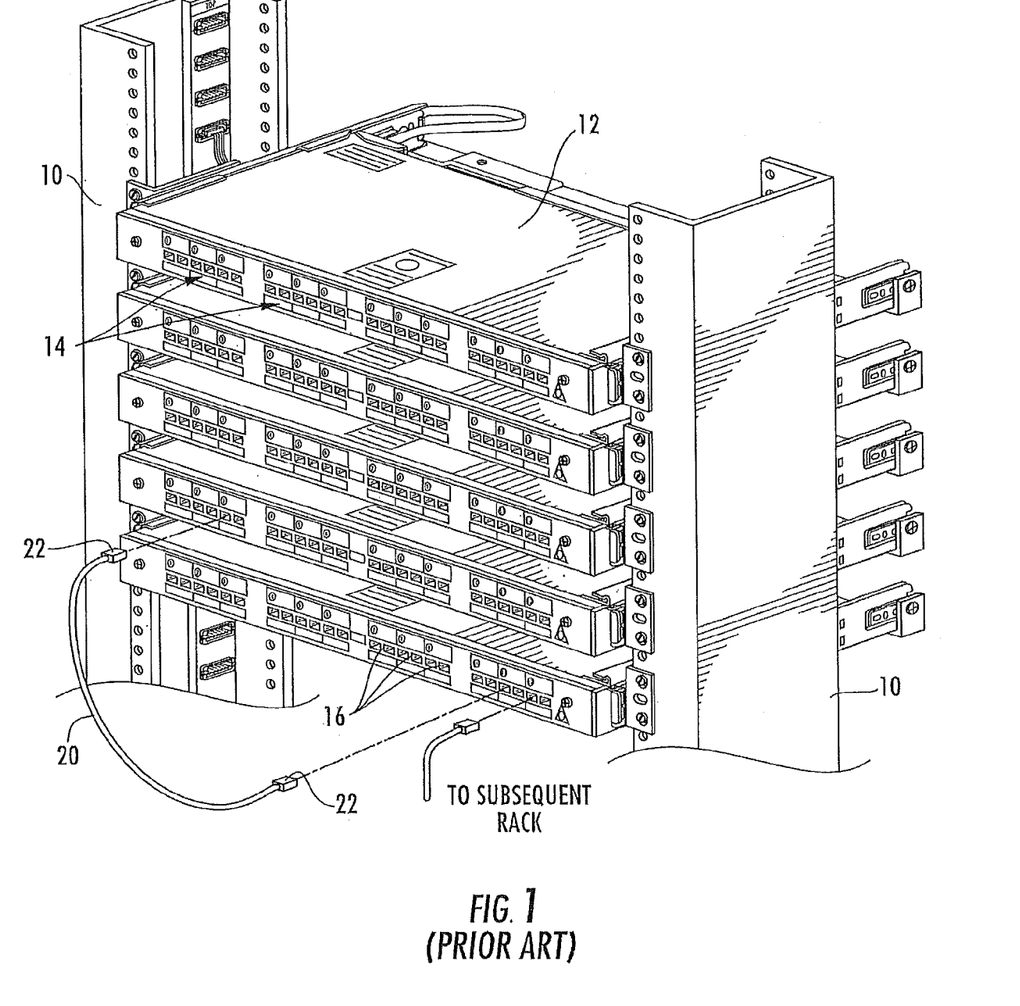
FIG. 1 is a perspective view of a typical prior art communication rack assembly containing multiple patch panels with connector ports that are selectively interconnected by patch cords.

Referring to FIG. 1, a typical prior art rack 10 is shown. The rack 10 retains a plurality of patch panels 12 that are mounted to the rack 10. On each of the patch panels 12 are located port assemblies 14. The illustrated port assemblies 14 each contain six optical communication connector ports (e.g., SC, ST and LC ports, etc.) 16. Each of the different communication connector ports 16 is hard wired to one of the communication lines. Accordingly, each communication line is terminated on a patch panel 12 in an organized manner. In small patch systems, all communication lines may terminate on the patch panels of the same rack. In larger patch systems, multiple racks may be used, wherein different communication lines terminate on different racks.

In FIG. 1, interconnections between the various communication lines are made using patch cords 20. Both ends of each patch cord 20 are terminated with connectors 22. One end of a patch cord 20 is connected to a connector port 16 of a first communication line and the opposite end of the patch cord 20 is connected to a connector port 16 of a second communication line. By selectively connecting the various communication lines with patch cords 20, any combination of communication lines can be interconnected.

In large enterprises, the number of patch panels utilized in a communications system can be quite large. In addition, many enterprises are currently investing in large internet data centers. As such, manageability of the equipment in a data center/communication closet is becoming increasingly important. One aspect of manageability that is being utilized in many data centers/communication closets is the use of structured cabling to interconnect equipment, particularly jumpers interconnecting patch panels and other equipment.

Conventionally, optical fiber cabling utilized as a jumper is assembled in the field. The cable is pulled from a reel, cut to length, and terminated with field-installed connectors at each end. The terminated ends are then inserted into respective adapters in equipment to be interconnected. However, the use of preterminated or preassembled cabling is increasingly being utilized to decrease installation time and cost, reduce system downtime and increase cabling reliability and performance. An additional advantage of preterminated cabling is that the skill level required for installation and interconnection of equipment in data centers/communication closets is lower than for installations utilizing field-assembled cabling. Unfortunately, the use of lower-skill installation/maintenance crews may increase the risk of improper interconnection of equipment in the field.

SUMMARY

It should be appreciated that this Summary is provided to introduce a selection of concepts in a simplified form, the concepts being further described below in the Detailed Description. This Summary is not intended to identify key features or essential features of this disclosure, nor is it intended to limit the scope of the invention.

According to some embodiments of the present invention, a communications system includes a plurality of patch panels, wherein each patch panel has a plurality of connector ports on a front surface thereof and one or more connector ports, such as optical couplers, etc., on a rear surface thereof for linking two or more patch panels together. A preterminated (i.e., preassembled, defined length) cable (RJ-type, optical, etc.) is utilized as a jumper to link two of the patch panels via their respective connector ports. The cable includes opposite ends with a respective connector at each end that is configured to be removably secured within a respective optical coupler. In some embodiments, each connector of the cable has an RFID tag attached thereto. The RFID tags for each respective cable have the same unique identifier stored therein. According to embodiments of the present invention, no two cables for a respective communications system have the same identifier stored within their respective RFID tags. In some embodiments, each RFID tag includes transmission, electrical, and/or optical property information for the cable stored therewithin.

An RF antenna is secured to the rear surface of each patch panel adjacent each of the one or more connector ports. Each antenna is configured to activate and read information from an RFID tag when a cable connector is secured within a connector port adjacent thereto. A microprocessor is configured to selectively energize each antenna secured to a patch panel such that each antenna activates and reads information from a cable RFID tag adjacent thereto. The microprocessor may also log cable interconnections with the patch panels, for example in a database or other data storage. In some embodiments, a microprocessor is configured to receive transmission, electrical, and/or optical property information read from a cable RFID tag and is configured to adjust power consumption of a communication channel associated with the respective cable. In some embodiments, each antenna for a respective patch panel is attached to a printed circuit board that is secured to the rear surface of the patch panel.

In other embodiments of the present invention, a connector at each end of a preterminated cable may utilize other technologies for storing a unique identifier that can be read when the connector is inserted and removed from an optical coupler or other type of connector port utilized to link patch panels together. For example, an identification chip having a unique identifier (e.g., serial number, serial ID, etc.) and/or transmission, electrical, and/or optical property information for the cable stored therein may be secured to each connector of a preterminated cable. A reader associated with a coupler/connector port is configured to read the information stored on a chip. As another example, optical technology may be utilized to read the actual serial number or other identification number, as well as other information displayed on a cable. For example, a CCD camera or other optical device may be associated with a coupler/connector port or multiple couplers/connector ports and may be configured to read an identifier on a cable. A microprocessor is in communication with each camera and logs cable interconnections with the patch panels. In some embodiments, a microprocessor is configured to receive transmission, electrical, and/or optical property information read from a cable, and is configured to adjust power consumption of a communication channel associated with the respective cable.

According to some embodiments of the present invention, a communications system includes a plurality of patch panels, wherein each patch panel has a plurality of connector ports on a front surface thereof and one or more connector ports on a rear surface thereof for linking two or more patch panels together. In some embodiments, the rear surface connector ports are optical couplers and the cable connectors are optical connectors. In other embodiments, the rear surface connector ports are RJ-type ports and the cable connectors are RJ-type connectors. A preterminated cable is utilized as a jumper to link two or more of the patch panels together via their respective rear surface connector ports. The cable includes opposite ends and a respective connector at each end that is configured to be removably secured within a respective rear surface connector port.

Each end of the cable has an information chip attached thereto with cable identification information and/or other information, such as transmission, electrical, and/or optical property information for the cable, stored within the chip. A reader is associated with each respective rear surface connector port and is configured to read information from a cable information chip when a cable connector is inserted into and/or removed from a respective rear surface connector port. In some embodiments, the cable information chips at each end of a cable have the same unique identifier stored therein. A microprocessor in communication with each reader is configured to log cable interconnections with the patch panels. In some embodiments, a microprocessor is configured to receive transmission, electrical, and/or optical property information read from a cable information chip, and is configured to adjust power consumption of a communication channel associated with the respective cable.

According to some embodiments of the present invention, a communications system includes a patch panel having a plurality of connector ports (e.g., optical connector ports, RJ-type connector ports, etc.) wherein each connector port connected to a respective communication line/channel. A cable (e.g., a patch cord or other type of cable) is configured to selectively interconnect pairs of the connector ports and includes opposite ends and a respective connector secured to each end. Each connector is configured to be removably secured within a connector port. The cable has transmission, electrical, and/or optical property information for the cable stored therewithin, and the patch panel is configured to read the stored information from the cable when a cable connector is secured within a connector port. In some embodiments, the information is stored on a tag attached to the cable and the patch panel includes a reader configured to read the information stored on the tag. In some embodiments, the information is displayed on the cable and the patch panel includes an optical camera configured to read the displayed information. In some embodiments, the information is displayed on a label attached to the cable, and/or engraved into a connector of the cable, and the patch panel includes an optical camera configured to read the information.

According to some embodiments of the present invention, a communications system includes a plurality of patch panels. Each patch panel has a plurality of connector ports on a front surface thereof, wherein each connector port is connected to a respective communication line, and each patch panel includes a connector port on a rear surface thereof for linking the patch panel to another patch panel. A cable is configured to link two of the patch panels together via their respective rear surface connector ports. The cable includes opposite ends and a respective connector at each end that is configured to be removably secured within a respective rear surface connector port. The cable has information stored therewithin that includes a cable identifier and transmission, electrical, and/or optical property information for the cable. Each patch panel is configured to read the stored information from the cable when a cable connector is secured within a connector port. In some embodiments, the information is stored on a tag attached to the cable and the patch panel includes a reader configured to read the information stored on the tag. In some embodiments, the information is displayed on the cable and the patch panel includes an optical camera configured to read the displayed information. In some embodiments, the information is displayed on a label attached to the cable, and/or engraved into a connector of the cable, and the patch panel includes an optical camera configured to read the information.

According to some embodiments of the present invention, a method of reducing or adjusting power consumption in a communications system includes reading information stored within a cable connected to a patch panel connector port, wherein the stored information includes transmission, electrical, and/or optical property information for the cable, and adjusting power consumption of a communication channel associated with the respective cable, based on the read information.

BRIEF DESCRIPTION OF THE DRAWINGS

The accompanying drawings, which form a part of the specification, illustrate various embodiments of the present invention. The drawings and description together serve to fully explain embodiments of the present invention.

DETAILED DESCRIPTION

The present invention will now be described more fully hereinafter with reference to the accompanying figures, in which embodiments of the invention are shown. This invention may, however, be embodied in many different forms and should not be construed as limited to the embodiments set forth herein. Like numbers refer to like elements throughout. In the figures, certain layers, components or features may be exaggerated for clarity, and broken lines illustrate optional features or operations unless specified otherwise. In addition, the sequence of operations (or steps) is not limited to the order presented in the figures and/or claims unless specifically indicated otherwise. In the drawings, the thickness of lines, layers, features, components and/or regions may be exaggerated for clarity and broken lines illustrate optional features or operations, unless specified otherwise. Features described with respect to one figure or embodiment can be associated with another embodiment of figure although not specifically described or shown as such.

It will be understood that when a feature, such as a layer, region or substrate, is referred to as being "on" another feature or element, it can be directly on the other feature or element or intervening features and/or elements may also be present. In contrast, when an element is referred to as being "directly on" another feature or element, there are no intervening elements present. It will also be understood that, when a feature or element is referred to as being "connected", "attached" or "coupled" to another feature or element, it can be directly connected, attached or coupled to the other element or intervening elements may be present. In contrast, when a feature or element is referred to as being "directly connected", "directly attached" or "directly coupled" to another element, there are no intervening elements present. Although described or shown with respect to one embodiment, the features so described or shown can apply to other embodiments.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, steps, operations, elements, and/or components, but do not preclude the presence or addition of one or more other features, steps, operations, elements, components, and/or groups thereof. As used herein, the term "and/or" includes any and all combinations of one or more of the associated listed items.

Spatially relative terms, such as "under", "below", "lower", "over", "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if a device in the figures is inverted, elements described as "under" or "beneath" other elements or features would then be oriented "over" the other elements or features. Thus, the exemplary term "under" can encompass both an orientation of over and under. The device may be otherwise oriented (rotated 90 degrees or at other orientations) and the spatially relative descriptors used herein interpreted accordingly. Similarly, the terms "upwardly", "downwardly", "vertical", "horizontal" and the like are used herein for the purpose of explanation only unless specifically indicated otherwise.

It will be understood that although the terms first and second are used herein to describe various components, regions, layers and/or sections, these components, regions, layers and/or sections should not be limited by these terms. These terms are only used to distinguish one component, region, layer or section from another component, region, layer or section. Thus, a first component, region, layer or section discussed below could be termed a second component, region, layer or section, and similarly, a second without departing from the teachings of the present invention. Like numbers refer to like elements throughout.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the specification and relevant art and should not be interpreted in an idealized or overly formal sense unless expressly so defined herein. Well-known functions or constructions may not be described in detail for brevity and/or clarity.

Figure 2:
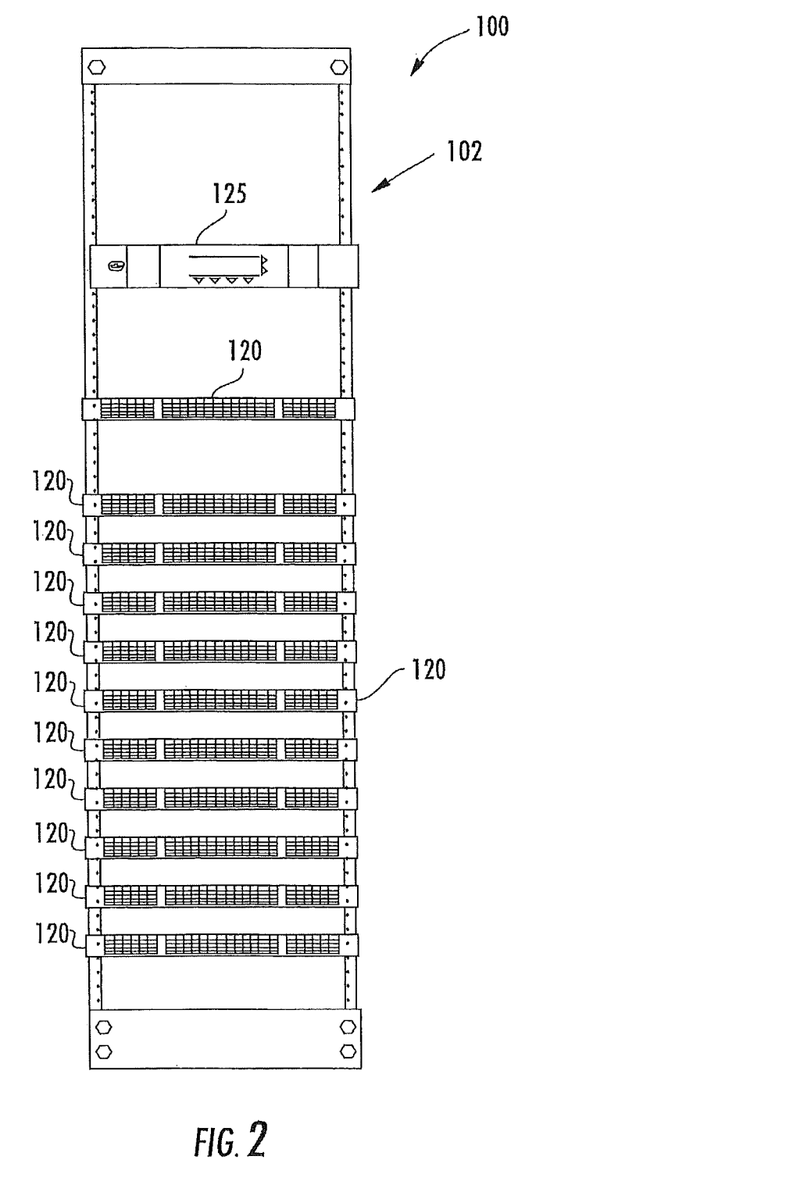
FIG. 2 illustrates a communication patching system in which embodiments of the present invention may be utilized.

Referring now to FIG. 2, a communication patching system 100, according to some embodiments of the present invention, is illustrated. The illustrated patching system 100 includes a frame 102 configured to support equipment mounted thereto in spaced-apart relationship. In the illustrated embodiment, a plurality of communications patch panels 120 are mounted to the frame 102 in spaced-apart locations. Embodiments of the present invention are not limited, however, to the illustrated frame configuration. Frames of any configuration, shape and size may be utilized in accordance with embodiments of the present invention. For example, frames that support equipment in horizontally spaced-apart relationship may also be utilized. Likewise, the patch panels 120 need not be spaced-apart from each other, but instead may be in direct contact with adjacent patch panels.

Figure 3:
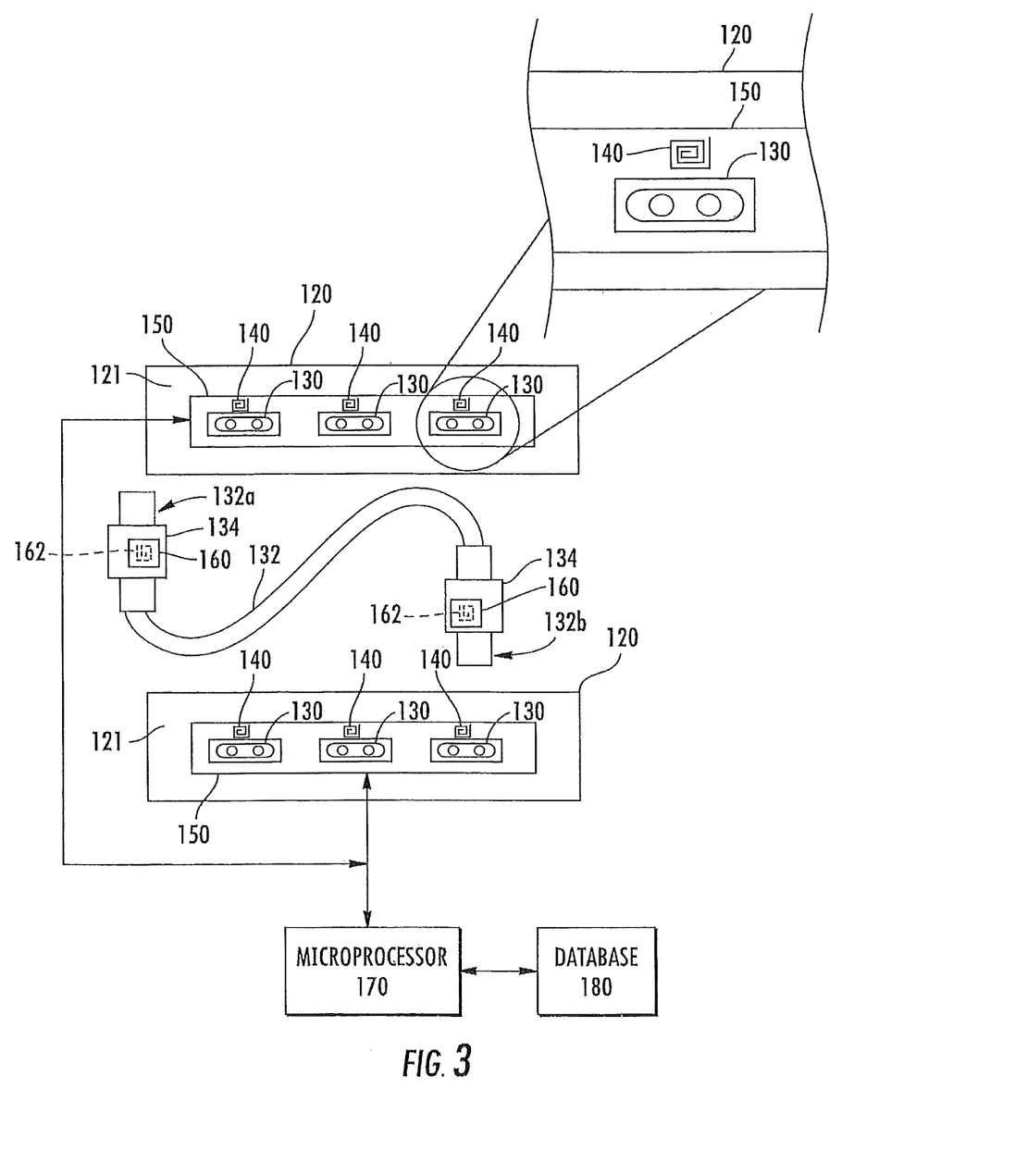
FIGS. 3-4 illustrate systems and methods for detecting patch panel cable information, according to some embodiments of the present invention.

The illustrated patch panels 120 may be interconnected or linked via preterminated optical cabling (jumpers) inserted within optical couplers located on the rear of the patch panels 120. FIG. 3 illustrates two of the patch panels 120 from FIG. 2 having optical couplers 130 on a rear surface 121 thereof. A preterminated cable 132 is configured to link the two patch panels together when the respective ends 132a, 132b are inserted within respective optical couplers 130. Each end 132a, 132b of the illustrated cable 132 has a Multi-fiber Push On (MPO) optical connector 134. However, cables utilized in accordance with embodiments of the present invention may have other types of optical connectors. Furthermore, various types of preterminated cables (e.g., copper cables, etc.) may be utilized in accordance with embodiments of the present invention. Embodiments of the present invention are not limited to optical cables and connectors. Moreover, embodiments of the present invention are not limited to optical cabling and optical couplers for linking patch panels. Various types of cables and connector ports may be utilized for linking patch panels in accordance with embodiments of the present invention without limitation. In addition, embodiments of the present invention may be utilized with patch cords utilized to interconnect connector ports on the front of patch panels with other connector ports and/or devices, as would be understood by those skilled in the art.

An RF (Radio Frequency) antenna 140 is secured to each patch panel 120 adjacent each respective coupler 130. Each antenna 140 is configured to activate and read information from an RFID (Radio Frequency IDentification) tag that is positioned adjacent thereto. The RF antennas 140 may be secured to the patch panels 120 in various ways (e.g., adhesively attached, attached via fasteners, embedded, etc.), as would be known to those skilled in the art. In the illustrated embodiment, the RF antennas 140 are attached to a printed circuit board (PCB) 150 which is secured to each respective patch panel rear surface 121. The RF antennas 140 may be attached to a surface of the PCB 150, may be disposed within the PCB 150, or may have one or more portions disposed within the PCB 150 and one or more portions on a surface of the PCB 150, as would be understood by those skilled in the art.

The illustrated preterminated cable 132 in FIG. 3 includes a respective RFID tag 160 attached to the connector 134 at each respective end 132a, 132b. In the illustrated embodiment, when a cable connector 134 is attached to a coupler 130 on the rear of a patch panel 120, the RFID tag 160 attached to the connector 134 is positioned in close proximity to the RF antenna 140 associated with the coupler 130.

An RFID tag 160 may be attached in various ways (e.g., adhesively attached, etc.) to a respective connector 134, as would be understood by those skilled in the art. Alternatively, an RFID tag 160 may be embedded within the material of a connector 134, as long as the RFID tag 160 can be positioned in close proximity to and read by an RF antenna 140 on the PCB 150.

Moreover, RFID tags 160 may be attached to the cable connectors 134 in various orientations. It is desirable that the electromagnetic field lines of an RF antenna 140 penetrate as much of the area of an RFID tag 160 as possible. Accordingly, positioning an RFID tag 160 such that the RFID tag 160 can be close to an RF antenna 140 associated with a patch panel coupler 130 is desirable.

Each RFID tag 160 includes an antenna 162 and a microchip (not shown) which is configured to store various information (e.g., numbers, alphanumeric characters, etc.). According to embodiments of the present invention, each RFID tag 160 attached to a respective cable 132 stores a unique identifier (e.g., number, alphanumeric string, etc.), and may store other information, as well (e.g., cable model number and/or other cable information, such as transmission, electrical, optical property information, etc.). In other words, the two RFID tags 160 for a respective cable 132 contain the same identifier. However, this identifier will be different from the identifiers assigned to other cables 132.

As would be understood by those skilled in the art of the present invention, each RFID tag 160 draws power from an RF field created by an RF antenna 140 when the RF antenna 140 is activated. The RFID tag 160 uses this power to power the circuits of its microchip to thereby transfer information stored therein.

According to some embodiments of the present invention, RFID tags 160 can be factory installed on cables 132. Alternatively, RFID tags 160 can be retrofitted on cables 132 in the field. When RFID tags 160 are factory installed, they can be programmed with information that indicates manufacturing date, operator's ID, factory code, serial numbers, transmission, electrical, optical property information, etc. If an RFID tag has read/write capabilities, then additional information could be added to the RFID tag in the field. For example, performance test data could be added to factory pre-programmed information.

RFID tags 160 that resonate at any frequency may be utilized in accordance with embodiments of the present invention. RF antennas and their use in detecting RFID tags and interrogating RFID tags for information are well understood by those of skill in the art and need not be discussed further herein.

As illustrated in FIG. 3 each PCB 150 attached to the rear of a respective patch panel 120 is in communication with a microprocessor 170 (e.g., directly connected, wirelessly connected, etc.). The microprocessor 170 may be virtually any type of processor, such as an 8-bit processor, and may retain a history of events within memory. The microprocessor may be associated with a rack controller (125, FIG. 2) or other device/software that controls the various functions/operations of the plurality of patch panels 120 in the communications system 100. Rack controllers are well understood by those skilled in the art of patch panels and need not be described further herein. According to some embodiments of the present invention, the microprocessor 170 is configured to selectively energize each antenna 140 on the rear of a patch panel 120 such that each antenna 140 activates and reads information from an RFID tag 160 attached to a cable connector 134, if present.

According to some embodiments, the microprocessor 170 is connected to RFID transceiver circuitry (not shown) in each PCB 150, which is in turn connected to all of the antennas 140 on the PCB 150 by way of a multiplexing device. The multiplexing device, under control of the microprocessor 170, connects the transceiver circuitry to one and only one antenna 140 at any given time. To activate an antenna 140 so as to read tag data from an RFID tag 160 located in proximity to that antenna 140, the following sequence is executed by the microprocessor 170. The microprocessor 170 configures the multiplexer to establish a connection between the RFID transceiver circuitry on a PCB 150 and the specific RFID antenna 140 on the PCB 150 that is to be activated. The microprocessor 170 issues a command to activate the RFID transceiver circuitry, which in turn energizes the selected antenna 140. The RFID transceiver circuitry then monitors the antenna 140 to see if a signal from an RFID tag is detected. If such a signal is detected, the RFID transceiver circuitry demodulates the RFID tag's signal and converts it into a digital bitstream, which is sent to the microprocessor 170. The microprocessor 170 monitors the digital data from the RFID transceiver circuitry until it has received all of the data from an RFID tag 160 in question. The microprocessor 170 sends a command to the RFID transceiver circuitry to shut down, which de-energizes the selected antenna 140.

At regular intervals, the microprocessor 170 may send instructions to the RFID transceiver circuitry on a PCB 150 of a patch panel 120, requesting that it energize each RF antenna 140 associated with a respective coupler 130 to see if an RFID tag 160 is detected. If an RFID tag 160 is detected, the unique identifier from the RFID tag 160 can be recorded along with an identification of the coupler 130. This information can be recorded, for example, in a database (or other data storage) 180 associated with the microprocessor 170. The RF antennas 140 on each PCB 150 may be sequentially activated or some other pattern of activation may be utilized.

According to some embodiments of the present invention, this recorded information may be forwarded to patch panel management software. The patch panel management software will eventually receive two messages containing the same identifier, and will know that the specified couplers 130 on two respective patch panels 120 sending the message are in fact cabled together. A cabling connectivity database could then be updated, without need for user intervention.

In a similar manner, if the connector 134 at one or both ends 132a, 132b of a cable 132 were to be removed from a respective coupler 130, regular polling of the RF antennas 140 by the microprocessor 170, as described above, will detect that an RFID tag 160 was no longer present, and will report the change back to the patch panel management software, which will update a cabling connectivity database accordingly.

Embodiments of the present invention are not limited to the use of RFID technology. Other technologies may be utilized as well. For example, an identification chip or tag having a unique identifier (e.g., serial number, serial ID, etc.) and other information stored therein may be secured to each connector of a preterminated cable. The tag can be, for example, an integrated circuit that is designed to store information and communicate the stored information to a microprocessor (e.g., microprocessor 170, FIG. 3) or another microprocessor having firmware that performs a storage and communication function. The tag includes contact that are connected to a patch panel's circuitry via these contacts when a connector is inserted into a connector port/coupler, and that are used by the patch panel to poll the tag for information. The patch panel circuitry associated with a coupler/connector port is configured to read the unique identifier stored on the tag.

As another example, optical technology may be utilized to read a serial number or other identification number displayed on a cable. For example, a CCD camera or other optical device may be associated with a coupler/connector port or multiple couplers/connector ports and may be configured to read information on a cable, such as an identifier, transmission, electrical, optical property information, etc.

This optical technology may utilize a software algorithm to poll for information displayed on a cable. A label is printed that contains unique information, such as a serial number. This label could be applied to the connector in various ways. For example, the label could be engraved into the connector using micro-engraving techniques. The label could be printed using a 2D barcode. The label could be printed in color using a color palette to encode the data.

A camera (e.g., a CCD, etc.) is attached to a patch panel, or otherwise located adjacent to a patch panel, and is used to detect the presence of a cable, as well as for retrieving information from the cable. The detection can be accomplished, for example, by detecting a light source or reflection that is changed when a cable is connected to the patch panel. The information on the label or engraving is read by the camera and decoded by a microprocessor, for example.

Figure 4:
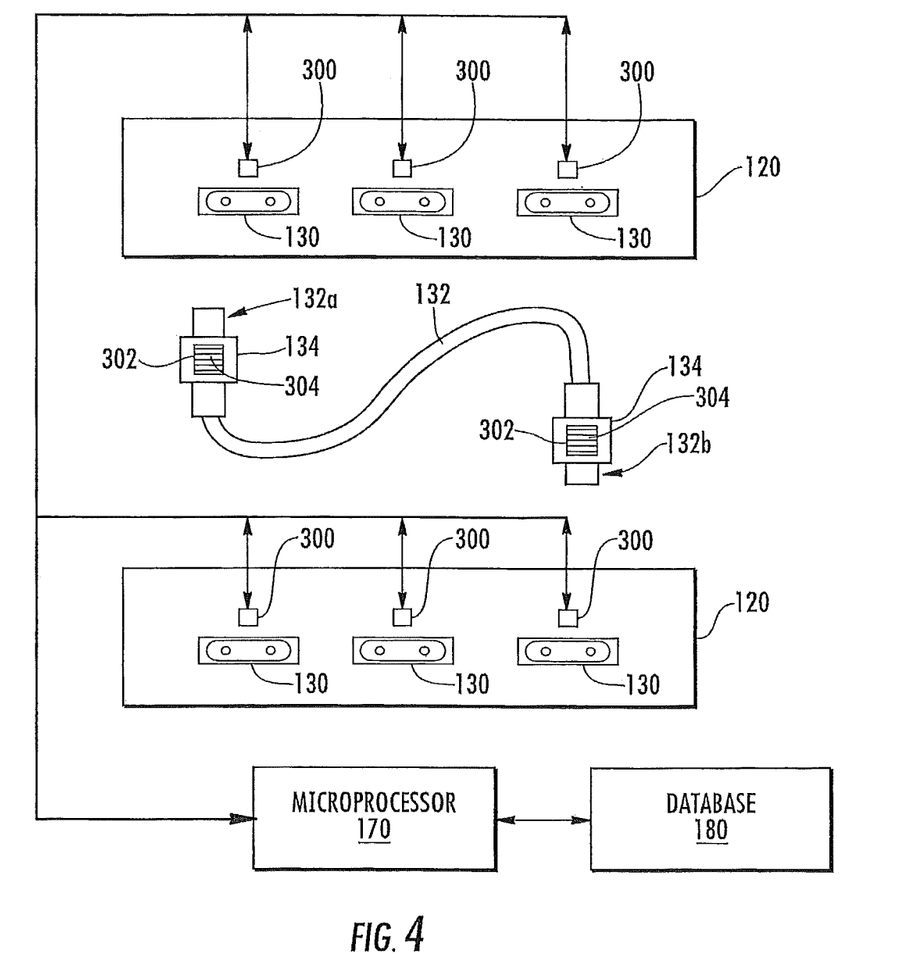

FIG. 4 illustrates patch panels 120 having a camera 300 positioned adjacent each coupler 130. Each camera 300 is configured to detect insertion of a cable connector 134 into a respective coupler 130. Each camera 300 is also configured to capture an image of information 304 displayed via label/engraving 302 on a connector 134. Each camera 300 is in communication with a microprocessor 170 that is configured to decode information 304 from an image captured by the camera 300 and to store the decoded information into data storage (e.g., database 180). Embodiments of the present invention, however, are not limited to a single camera at each coupler. In some embodiments, a single camera may be used for multiple couplers.

According to other embodiments of the present invention, each of the above-described technologies may be utilized to read other types of information stored in patching system cables. For example, in data centers, there is a current initiative to reduce power consumption. As such, cables (including patch cords) utilized in patching systems can store various information (e.g., transmission, electrical, optical information) for the cable as well as devices to which the cable is to be connected. For example, this information can be stored in the cables at the factory. The various information can be read by patch panels and passed along to the management system for the patching system. The management system for a communications system can analyze a channel (i.e., communication line or link) and configure a switch and/or server to adjust the power used in the communication channel based on information read from one or more cables. This would allow each communication channel to reduce the power needed for transmission to the proper level for this particular channel instead of driving the channel so it works on all combinations of length and transmission variables to meet a standard. By allowing for variable control of power consumption by channel, according to embodiments of the present invention, considerable savings in energy costs may be obtained for communications systems.

The foregoing is illustrative of the present invention and is not to be construed as limiting thereof. Although a few exemplary embodiments of this invention have been described, those skilled in the art will readily appreciate that many modifications are possible in the exemplary embodiments without materially departing from the novel teachings and advantages of this invention. Accordingly, all such modifications are intended to be included within the scope of this invention as defined in the claims. The invention is defined by the following claims, with equivalents of the claims to be included therein.

That which is claimed is:

1. A method of adjusting power consumption in a communications system, wherein the communications system includes one or more patch panels, each patch panel having a plurality of connector ports, and each connector port connected to a respective communication line, the method comprising:
reading information associated with a cable connected to a respective patch panel connector port, wherein the information includes transmission, electrical, and/or optical property information for the cable; and
adjusting power consumption of a communication channel associated with the respective cable.

2. The method of claim 1, wherein adjusting power consumption of a communication channel associated with the respective cable comprises reducing the power consumption of the communication channel.

3. The method of claim 1, wherein adjusting power consumption of a communication channel associated with the respective cable comprises increasing the power consumption of the communication channel.

4. The method of claim 1, wherein the information is stored on a tag attached to the cable, wherein the patch panel comprises a reader configured to read the information stored on the tag, and wherein reading the information is performed via the reader.

5. A method of adjusting power consumption in a communications system, wherein the communications system includes one or more patch panels, each patch panel having a plurality of connector ports, and each connector port connected to a respective communication line, the method comprising:
reading information associated with a cable connected to a respective patch panel connector port, wherein the information is displayed on the cable, wherein the information includes transmission, electrical, and/or optical property information for the cable, wherein the patch panel comprises an optical camera configured to read the displayed information, and wherein reading the information is performed via the camera; and
adjusting power consumption of a communication channel associated with the respective cable.

6. The method of claim 5, wherein the information is displayed on a label attached to the cable, and/or engraved into a connector of the cable.

7. The method of claim 5, wherein the information is displayed on a label as a 2D barcode.

8. The method of claim 5, wherein the information is displayed on a label in color.

9. The method of claim 1, wherein the information includes transmission, electrical, and/or optical property information for a device connected to a communication line associated with the respective connector port.

* * * * *